United States Patent [19]

Oshima et al.

[11] Patent Number: 4,933,076
[45] Date of Patent: Jun. 12, 1990

[54] MULTI-UNIT FLUSH SYSTEM HAVING CARBON ADSORBER COLUMN IN CALCIUM CARBONATE BED

[76] Inventors: Eiji Oshima, No. 1460, Shukumachi, Tosu-shi, Saga-ken; Mahisa Matsufuji, No. 7-16, Kasumigaoka 5-chome, Higashi-ku, Fukuoka-shi, Fukuoka-ken, both of Japan

[21] Appl. No.: 242,198

[22] Filed: Sep. 9, 1988

[51] Int. Cl.$^5$ .................. C02F 3/30; B01D 15/00
[52] U.S. Cl. .................. 210/151; 210/195.1; 210/202; 210/265; 210/605; 210/764; 210/631; 210/629; 210/532.2
[58] Field of Search ............... 210/605, 617, 630, 631, 210/265, 607, 202, 623, 624, 629, 151, 764, 615, 170, 532.2, 195.1; 4/317, 318

[56] References Cited

U.S. PATENT DOCUMENTS

| | | | |
|---|---|---|---|
| 691,365 | 1/1902 | Dittler | 210/605 |
| 2,974,800 | 3/1961 | Fleischmann | 210/605 |
| 3,563,888 | 2/1971 | Klock | 210/617 |
| 3,666,106 | 5/1972 | Green | 210/605 |
| 3,930,998 | 1/1976 | Knopp et al. | 210/631 |
| 4,008,159 | 2/1977 | Besik | 210/617 |
| 4,073,722 | 2/1978 | Grutsch et al. | 210/631 |
| 4,134,830 | 1/1979 | Skogman et al. | 210/605 |
| 4,137,158 | 1/1979 | Ishida et al. | 210/630 |
| 4,160,724 | 7/1979 | Laughton | 210/605 |
| 4,188,289 | 2/1980 | Besik | 210/617 |
| 4,315,823 | 2/1982 | Witt et al. | 210/605 |
| 4,344,848 | 8/1982 | Hakulinen | 210/617 |
| 4,522,722 | 6/1985 | Nicholas | 210/605 |

FOREIGN PATENT DOCUMENTS 5106 5/1987 Japan .

Primary Examiner—W. Gary Jones
Assistant Examiner—Cynthia L. Nessler
Attorney, Agent, or Firm—Mason, Fenwick & Lawrence

[57] ABSTRACT

A flushing water-circulation type flush system to purify living water or sewage into clean water. Water discharged from a toilet is directed successively to a filter bed unit having filter material therein, to an aeration unit, to a settling unit where solids are settled out, to a pH regulation unit containing an adsorber column having activated carbon therein, the pH unit also containing a source of calcium carbonate, with the adsorber extending therethrough. Outflow from the adsorber is passed through a sterilizer unit to a flushing water unit which serves as a source for supplying flushing water to a water reservoir for the toilet.

11 Claims, 2 Drawing Sheets

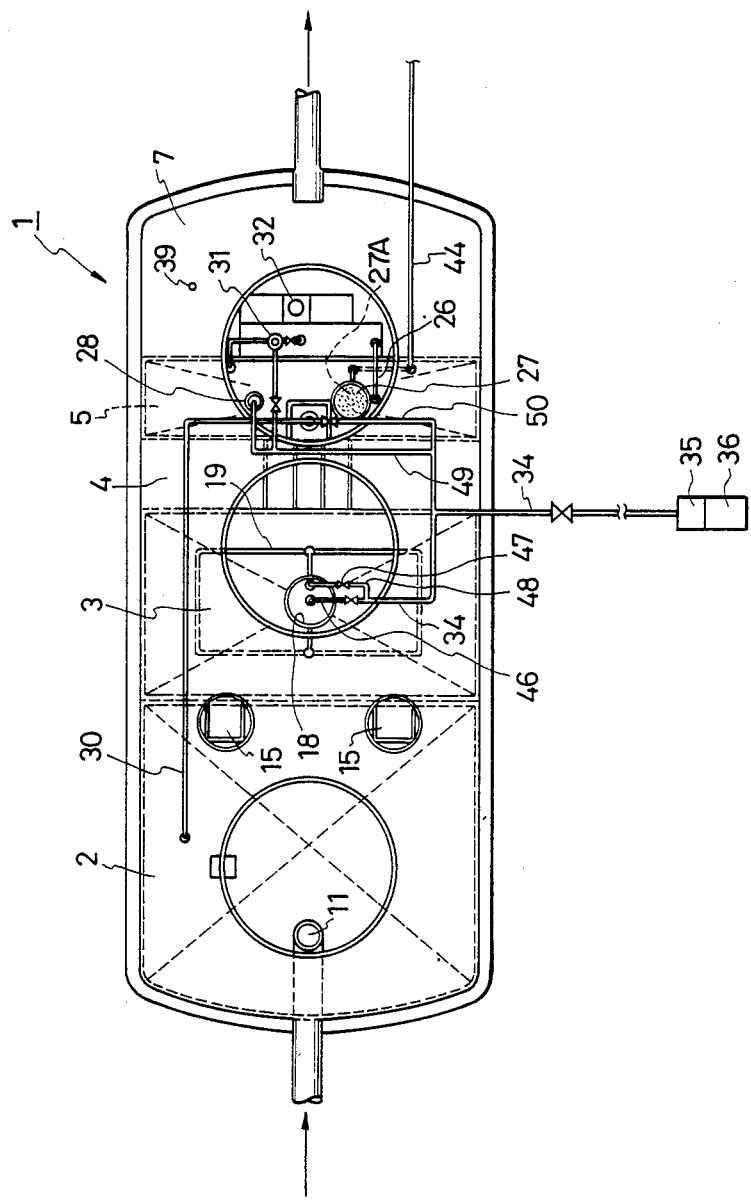

MULTI-UNIT FLUSH SYSTEM HAVING CARBON ADSORBER COLUMN IN CALCIUM CARBONATE BED

FIELD OF THE INVENTION

The present invention relates to a flushing water-circulation type flush system which can purify living waste water or sewage into clean water recyclable as flushing water, making it possible to set up flush toilets assuring a comfortable life as in city, as well as in agricultural areas where sewerage systems are not provided.

STATEMENT OF THE PRIOR ART

Heretofore, a number of proposals have been made of such a system, as represented by a purification and circulation type flush system disclosed in Japanese Utility Model Publication No. 5106/1987.

According to this system, sewage discharged from a toilet stool is purified by passing it successively through a filth settling and separating tank, a plurality of aerators, a washing tank and a cylindrical sterilizer, which are all buried in the ground. Then, after the remaining suspended matters have been filtered out, the sewage under treatment is circulated through a plurality of filters set up on the ground by means of a driving pump for purification, thereby obtaining purified water. As occasion arises, a part of the purified water is supplied to a water tank by the manipulation of a lever provided with the water tank so as to recycle it as flushing water.

Although the above system is by and large effective for the purification of sewage, it has the following disadvantages.

First of all, when the amount of load on the unit in which sewage flows is smaller than the amount of load preset for it, inorganic and organic nitrogen in the sewage is sufficiently oxidized by nitrite and nitrification bacteria living in the aeration tanks, so that increased hydrogen ions are generated, while the pH of the sewage during treatment is reduced to below 3.8. In some cases, this may lead to a remarkable lowering of the purification capability of the aeration tanks.

It is desired that the pH of the aeration tanks be maintained at a range of 5.8 to 8.6. However, since the circulation mechanism of this system includes no pH regulator, this system may possibly work in a state where the aeration tanks do not properly fulfill their own purification function. It is therefore difficult to obtain flushing water having stabilized properties.

As the pH value of the sewage under treatment is lowered with the progress of the oxidation thereof, the disintegration of suspended matters takes place and the supernatant of the sewage under treatment in a settling tank is suspended. Since the filtration of such supernatant causes clogging of the filter used for the purpose, the filter is required to be frequently checked and cleaned so as to enable it to fulfill its necessary function. Thus, this system is troublesome to maintain and control.

Another disadvantage is that the working cost per system is increased, because a considerably high power cost is needed to circulte the sewage under treatment from a pump chamber buried in the ground to a plurality of filters set up on the ground by constant operation of the pump.

SUMMARY OF THE INVENTION

The flushing water-circulation type flush system according to the present invention includes an anaerobic filter-bed unit and a contact aeration unit and, hence, ensures the digestion of organic filth matters contained in sewage. The present system can work in a constantly stable state, even when there is a variation in the amount of load on the unit in which sewage flows, because the sewage under treatment is maintained by the pH regulation unit at a pH value at which the anaerobic filter-bed and contact aeration units function properly. Thus, it is possible to obtain flushing water having stabilized properties.

Since the pH value of the sewage under treatment is always maintained in a proper range, it is assumed that suspended matters do to appreciably disintegrate and settle down as sludge, eliminating the possibility of the occurrence of a suspension phenomenon in the sewage under treatment in the units subsequent to the aeration unit and, hence, eliminate an accident which may impede the operation of the system. Thus, the present invention is easy to maintain and control.

A pump in the water supply arrangement is actuated by the manipulation of a lever, only when occasion arises, and a main portion of the power is consumed by an air blower of a constantly working air supply unit. Thus, the working cost of the system is relatively low.

A main object of the present invention is to provide a flushing water-circulartion type flush system which satisfactorily solves the problems mentioned above by the provision of a system of greatly increased capability in which a pH regulation unit is provided to regulate the pH of an aeration unit to around 7, and a mixing unit and a back-flushing unit are provided in the aeration and pH regulation units, and which can reduce the power cost.

BRIEF DESCRIPTION OF THE DRAWINGS

The aforesaid and other objects and aspects of the present invention will become apparent from the following detailed description with reference to the accompanying drawings, which are illustrative only:

FIG. 2 is a plan view of parts of said system, partly schematic.

DETAILED DESCRIPTION OF THE INVENTION

Figure 1:
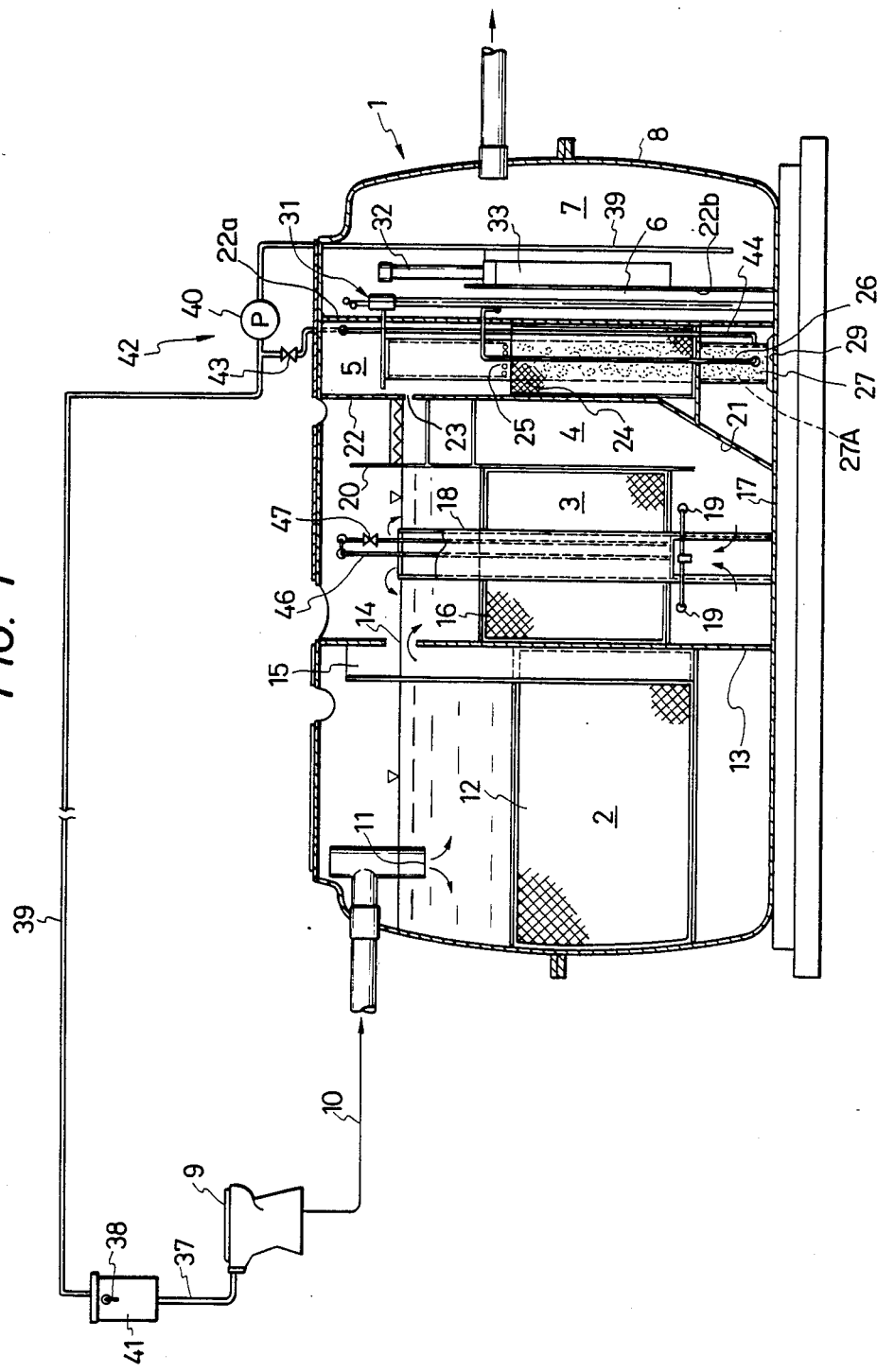
FIG. 1 is an elevational view, with parts in section, and partly schematic, of a flushing water-circulation type flush system in accordance with the invention.

The present invention will now be explained in greater detail with reference to the embodiment shown in FIGS. 1 and 2. A sewage disposal system 1 comprises an anaerobic filter-bed unit 2, a contact aeration unit 3, a settling unit 4, a pH regulation unit 5, a circulation unit 6 and a flushing water unit 7 which are juxtaposed in series in a tank 8, and is located below a toilet stool 9. The tank 8 may be the ground.

The anaerobic filter-bed unit 2 is between an end wall of tank 8 and separator wall board has in its upper region a discharge port 11 of a sewage pipe 10 connected to the toilet stool 9, which is disposed above it; a layer of filter-bed material 12 such as a cross type corrugated-sheet filler material is floatingly located approximately at the mid-depth of filter-bed unit 20 and has a volume of about 50% thereof. Two vertical delivery pipes 15 are located at the right-hand end of filter-bed unit 2 and are spaced from layer 12. Pipes 15 are open at their lower ends to the region below the lowermost layer of the filter-bed material 12 and include an outlet port 14 in communication with the adjacent contact aeration unit 3 through partition wall 13 which is a common wall to filter-bed unit 2 and aeration unit 3. Outlet port 14 is a short distance below the top of tank 8.

The contact aeration unit 3 is between partition walls 13 and 20, and communicates with the anaerobic filter-bed unit 2 through the outlet port 14; it includes a layer of contacting material 16 in the form of, e.g., a corrugated sheet, which is floatingly located approximately at the mid-depth of aeration unit 3 and has a volume of about 55% thereof. A central circulation pipe 18 extends vertically through the contact material 16, into the bottom of which air is blown to suck the sewage from near the bottom 17 of the aeration unit 3 and discharge it from its upper end, thereby circulating the sewage above and below the contact material 16. As shown in FIG. 3, a rectangular air diffusion pipe 19 is disposed in the vicinity of the underside of the contact material 16 and is provided with a plurality of air vent holes at suitable intervals, said air diffusion pipe 19 blowing air into the aeration unit 3, thereby forcefully removing biologicl film which may be formed on the surface of the contact material 16 by the oxidative digestion of filth matters contained in the sewage, when such film thickens to such a degree that the contact material 16 is clogged.

The settling unit 4, between partition walls 20 and 22, communicates with the contact aeration unit 3 through partition wall 20 which is open near the bottom 17 of the contact aeration unit 3. Settling unit 4 has a bottom 21 extending from partition wall 22, inclined so that settling sludge is easily moved toward the bottom 17 of the contact aeration unit 3. Partition wall 22 includes a port 23 for communication with the adjacent pH regulation unit 5, and located a short distance from the top of tank 8.

The pH regulation unit 5 is between partition walls 22 and 22a, and communicates with the settling unit 4 via the inlet port 23 in and near the tip of partition wall 22. A layer of pH regulation material 24 is located approximately at the mid-depth of unit 5 and comprises a meshed bag filled with suitably pulverized oyster-shells; a cylindrical absorber 27 for the decoloration, etc. of the sewage under treatment, which is provided with suction ports 25 in the vicinity of the level of the sewage under treatment, has an outflow pipe 26 connected to it near its lower end. Outflow pipe 26 extends upwardly, then through partition wall 22a into the upper portion of the adjacent circulation unit 6. Adsorber is filled with activated carbon 27A in its lower part and extends vertically through the pH regulation material 24. A cylindrical draft pipe 28 extends vertically through the pH regulation material 24, laterally of adsorber 27 as shown in FIG. 2, for circulating the sewage above and below the pH regulation material 24 on the same principle as the circulation pipe 18. Draft pipe 28, now shown in FIG. 1 for purpose of clarity, is provided with air blown through air pipe 19. A sludge return conduit 30 extends through the pH regulation material 24 for sucking up the sludge which has been deposited on bottom 29 of the pH regulation unit 5 and returns it to the anaerobic filter-bed unit 2.

The circulation unit 6 is spaced at the partition walls 22a, and the outflow pipe 26 of the adsorber 27 discharges adjacent circulation unit 6, circulates th sewage under treatment to the pH regulation unit 5 so as to achieve complete pH regulation and decoloration. The circulation unit 6 is provided with a vertical air lift circulator 31 between partition walls 22a and 22b, working on the same principle as the draft pipe 28.

The flushing water unit 7 is adjacent an end wall of tank 8 and has a sterilizer 33 fixedly provided on the side of the circulation unit 6 in such a manner that an antiseptic contacts the sewage flowing through the sterilizer 33, passing through a chamber therein for holding an antiseptic cylinder 32 filled with said antiseptic.

The sewage disposal system 1 also includes, as shown in FIG. 2, an air supply conduit 36 having an air blower 35 for feeding the necessary air to the circulation pipe 18, air diffusion pipe 19, draft pipe 28, sludge return conduit 30 and air lift circulator 31 by way of a pipe 34 having valves at the required sites; and a water supply system 42 having a water reservoir 41 located above the toilet stool 9 and connected thereto by way of a water pipe 37, said reservoir 41 including a lever 38 which is manipulated to actuate a pump 40 connected to a pipe 39 joined to the flushing water unit 7 for the circulation of flushing water. It is noted that the pipe 39 of the water supply system 42 is connected to the back-flushing pipe 44 for supplying flushing water to the bottom of the adsorber 27 through a valve 43, which is adapted to be opened so as to actuate the pump 40 and closed so as to stop the pump 40.

The flush system according to the present invention is constructed as above described. Reference will now be made to the process of the purification and circulation of sewage.

As the lever 38 is manipulated, the flushing water stored in the water reservoir 41 is fed to the toilet stool 9 by way of the water pipe 37 for flushing it, whence it flows as sewage into the anaerobic filter-bed unit 2 through the discharge port 11 of the sewage pipe 10. In the anaerobic filter-bed unit 2, the sewage passes downwardly through the filter-bed material 12, while organic matters contained therein are anaerobically digested and deposited/purified by the action of microbes under permeable and absolute anaerobic conditions. It is understood that a part of undigested inorganic and organic matters settles down and accumulates as sludge on the bottom of tank 8, and some solid matters float on the sewage.

The sewage, which has been digested and purified in the anaerobic filter-bed unit 2, then flows from the bottom of the filter-bed unit 2 through both of the delivery pipes 15 and the outlet port 14 of each into the adjacent contact aeration unit 3. In the contact aeration unit 3, the sewage passes downwardly through the contact material 16, during which filth matters contained therein such as organic matters come in repeated contact with an aerobic biological film growing on the contact material 16 under aerobic conditions and, in the meantime, they are adsorded thereto and undergo oxidative digestion thereon. Air is blown from the pipe 48 which is connected to the pipe 34 of the air supply conduit 36 into the lower portion of the circulation pipe 18, whereby the sewage is sucked up from around the lower end of the circulation pipe 18 and forced up together with the air, and is discharged from the upper end thereof. In this manner, the sewage below the contact material 16 is circulated to promote the oxidative digestion, while the air is supplied to create the aerobic conditions. It is understood that when the biological film growing on the contact material 16 thickens to such a degree that the contact material 16 is clogged with the progress of the oxidative digestion of sewage, the valve 47 is opened to feed air from the pipe 48 connected by the pipe 34 to the air diffusion pipe 19, from which the air is supplied in the form of bubbles which give vibrations to the contact material 16 and the surrounding sewage, thereby forcefully peeling off the thickened biological film.

The thus peeled-off sludge is entrained in a stirring stream produced by bubbles, goes up, and travels to the anaerobic filter-bed unit 2 by way of the delivery pipe 15, settling on the bottom of it. The sewage under treatment in the contact aeration unit 3 is transferred from its lower portion to the settling unit 4 in which, during residence, the suspended matters in that sewage settle down and separate out, and the thus purified supernatant water overflows from the inlet port 23 into the pH regulation unit 5.

When the sewage under treatment is sufficiently oxidized in the contact aeration unit 3, the inorganic and organic nitrogen contained therein is oxidized to nitric and nitrous nitrogen by nitrification bacteria, which produce hydrogen ions acting to lower pH, bringing the sewage to an acidic region (at below pH 5.8 in an extreme case). In the pH regulation unit 5, therefore, the sewage under treatment is allowed to react with calcium carbonate that is a main component of the oyster-shells of the pH regulator unit 5 whereby it is regulated to a pH range of 7 to 8 in which the anaerobic filter-bed unit 2 and contact aeration unit 3 function properly and, at the same time, the rest of suspended matters contained in the sewage under treatment is adsorbed onto the surfaces of the oyster-shells, giving the sewage under treatment an extremely reduced amount of suspended matters.

Subsequently, the sewage under treatment having its pH value regulated flows from the suction ports 25 into the adsorber 27, and passes downwardly through the activated carbon 27A which is inside it, during which the organic matters remaining in the sewage inder treatment are desorbed onto activated carbon, so that it becomes almost colorless and transparent. Then, the sewage under treatment flows through the outflow pipe 26 into the adjacent circulation unit 6.

It is noted that effective adjustment of pH values in the pH regulation unit 5 is achievable by blowing air from the pipe 49 into the lower end of the draft pipe 28 and circulating the sewage under treatment above and below the pH regulation material 24 on the same principle as the circulation pipe 18, for the purpose of mixing. Air is also blown from the pipe 50 into the sludge return conduit 30 to return the sludge settled on the bottom to the anaerobic filter-bed unit 2 on the same principle as the circulation and draft pipes 18 and 28. If the adsorber 27 is used over an extended period of time, slight amount of suspended substances contained in the sewage under treatment is then absorbed and accumulated thereon so that the filtration resistance is increased enough to bring the working level up to the substantially same level as the settling unit 4. In that case, the valve 43 of the back-flushing pipe 44 connected to of the pipe 39 of the water supply system 42 is used to actuate the pump 40 for pressurizing the flushing water, which is then used to flush the activated carbon layer from below, thereby recovering the filtering capability.

In the circulation unit 6 into which the sewage under treatment flows by way of the outflow pipe 26, some of the sewage, now substantially colorless and transparent, is circulated back to the pH regulation unit 5 by the air lift circulator 31 so as to extend the time of contact thereof with the pH regulation material 24 in the pH regulation unit 5 and activated carbon in the adsorber 27.

The sewage under treatment overflows from the upper portion of the circulation unit 6, and flows into the flushing water unit 7 through the sterilzer 33 fixed to the side thereof. While passing through the sterilizer 33, the sewage under treatment is sterilized, because bacteria such as Escherichia coli living therein are killed by chlorine leaching out of a chlorine agent filled in the antiseptic cylinder 32.

When the lever 38 of the water reservoir 41 is manipulated to flush the toilet stool 9, the pump 40 of the water supply system 42 is actuated to transfer the flushing water stored in the flushing water unit 7 to the water reservoir 41, and the pump 40 is automatically stopped upon the water reservoir 41 being filled with a predetermined amount of water.

It is noted that in order to facilitate internal checking, repairing and cleaning of the sewage disposal system 1, as shown in FIG. 2, manholes are provided in the upper portions of the tank 8 above the anaerobic filter-bed unit 2, the delivery pipe 15, the contact aeration and settling units 3 and 4, and the pH regulation and flushing water units 5 and 7.

In the one specific embodiment as described above, the delivery pipes 15 of the anaerobic filter-bed unit 2 are provided at two location with a suitable space between them. However, such an arrangement may be varied depending upon the amount of sewage to be treated. If the amount of sewage and the volume of the filter-bed unit 5 are small, then only a single delivery pipe 15 may be provided. If the amount of sewage is large, on the contrary, then multiple delivery pipes 15 may be provided.

The air diffusion pipe 19 of the contact aeration unit 3 as shown in at rectangular configuration below the bottom of the contact material 16. It is understood, however, that the present invention need not be limited to the rectangular configuration, if the air bubbles issuing therefrom strike over the entire surface of the contact material 15. It is also understood that although oyster-shells are used for the pH regulation material 24 disposed in the pH regulation unit 5, other materials may be employed, provided that they contain a neutralizer such as calcium carbonate.

While the pH regulation unit 5 has been described to include the draft pipe 28, the draft pipe 28 may be omitted when a material less resistant to the passage of the sewage under treatment is employed for the pH regulation material 24. In that case, the pH regulation unit 5 may without the circulation provided by the draft pipe 28 function.

The system according to the present invention digests organic filth matters contained in sewage in the two stages of the anaerobic filter-bed unit and the contact aeration unit, and works in a constantly stable state, even when there is a variation in the amount of load applied on the unit in which the sewage flows, because a pH value at which both the above units function properly is maintained by the pH regulation unit. It is thus possible to obtain flushing water having stabilized properties and, hence, completely meet the demand of users.

Since the pH value of the sewage under treatment is always maintained in a proper range, it is assured that suspended matters do not appreciably disintegrate and settle down as sludge, eliminating the possibility of occurrence of a suspension phenomenon in the sewage under treatment in the units subsequent to the aeration unit and, hence, an accident which may impede the operation of the system. Thus, the present system is very easy to maintain and control.

Since only the air blower of the air supply unit works constantly, the power consumed by the overall system is so reduced and the operating cost is very low.

What is claimed is:

1. A flushing water-circulation type flush system comprising:
   a toilet,
   a water reservoir above the toilet and connected to it,
   an anaerobic filter-bed unit,
   a sewage pipe extending downwardly from the toilet to the upper portion of said filter-bed unit,
   a layer of filter-bed material in said filter-bed unit and located approximately at the mid-depth thereof with the bottom of said layer of filter-bed material above the bottom of said filter-bed unit,
   a contact aeration unit having contact material therein approximately at the mid-depth thereof, and having means therein for circulating material from below said contact material to above said contact material,
   means including a delivery pipe for providing a fluid flow path from below said filter-bed material in said filter-bed unit to above said contact material in said contact aeration unit,
   a settling unit adjacent to said contact aeration unit,
   a partition wall between said settling unit and said contact aeration unit, said partition wall being open at the bottom of said contact aeration unit and said settling unit for providing communication therebetween,
   a pH regulation unit adjacent said settling unit having pH regulation material therein comprising a source of calcium carbonate,
   a vertical cylindrical adsorber in said pH regulation unit, extending through said pH regulation material and containing activated carbon therein,
   a partition wall separating said settling unit and said pH regulation unit having a port therein near and spaced from the top thereof for providing communication between said settling unit and said pH regulation unit,
   a circulation unit adjacent to said pH regulation unit comprising means for circulating sewage material from the bottom of said circulation unit to the top of said adsorber including means for supplying air thereto,
   means comprising an outflow pipe for transferring sewage from the bottom of said adsorber to the top of said circulation unit,
   sterilizing means for receiving water from said circulation unit and for sterilizing wastes,
   a flushing water unit for receiving sterilized water from said sterilizing means, and
   means including a pump for conducting water from said flushing water unit to said water reservoir for recycling flushing water from said flushing water unit to said water reservoir.

2. A flush system as claimed in claim 1, wherein said contact aeration unit further includes air diffusion pipe means below said contact material for diffusing air thereinto.

3. A flush system as claimed in claim 2, wherein said pH regulation material comprises oyster-shells.

4. A flush system as claimed in claim 1, wherein said pH regulation material comprises oyster-shells.

5. A flush system as claimed in any one of claims 1, 2, or 3, wherein said pH regulation unit has therein means extending through said pH regulation material for circulating the sewage under treatment from below to above said pH regulation material.

6. A flush system as claimed in any one of claims 1, 2, or 3, and further comprising means for returning sludge from the bottom of said pH regulation unit to said anaerobic filter-bed unit.

7. A flush system as claimed in claim 6, wherein said sludge returning means comprises a conduit and means for blowing air thereinto.

8. A flush system as claimed in any one of claims 1, 2, or 3, and further comprising means for supplying flushing water to the bottom of said adsorber.

9. A flush system as claimed in claim 8, wherein said means for supplying flushing water comprises a back-flushing pipe connected to said pump by a conduit.

10. A flush system as claimed in claim 9, and a valve in said conduit connecting said back-flushing pipe to said pump.

11. A flush system as claimed in claim 9, wherein said back-flushing pipe extends through said pH regulation material.

* * * * *